Nov. 10, 1931.   A. L. DUNCAN   1,831,786
FRUIT PEELING APPARATUS
Filed April 20, 1926
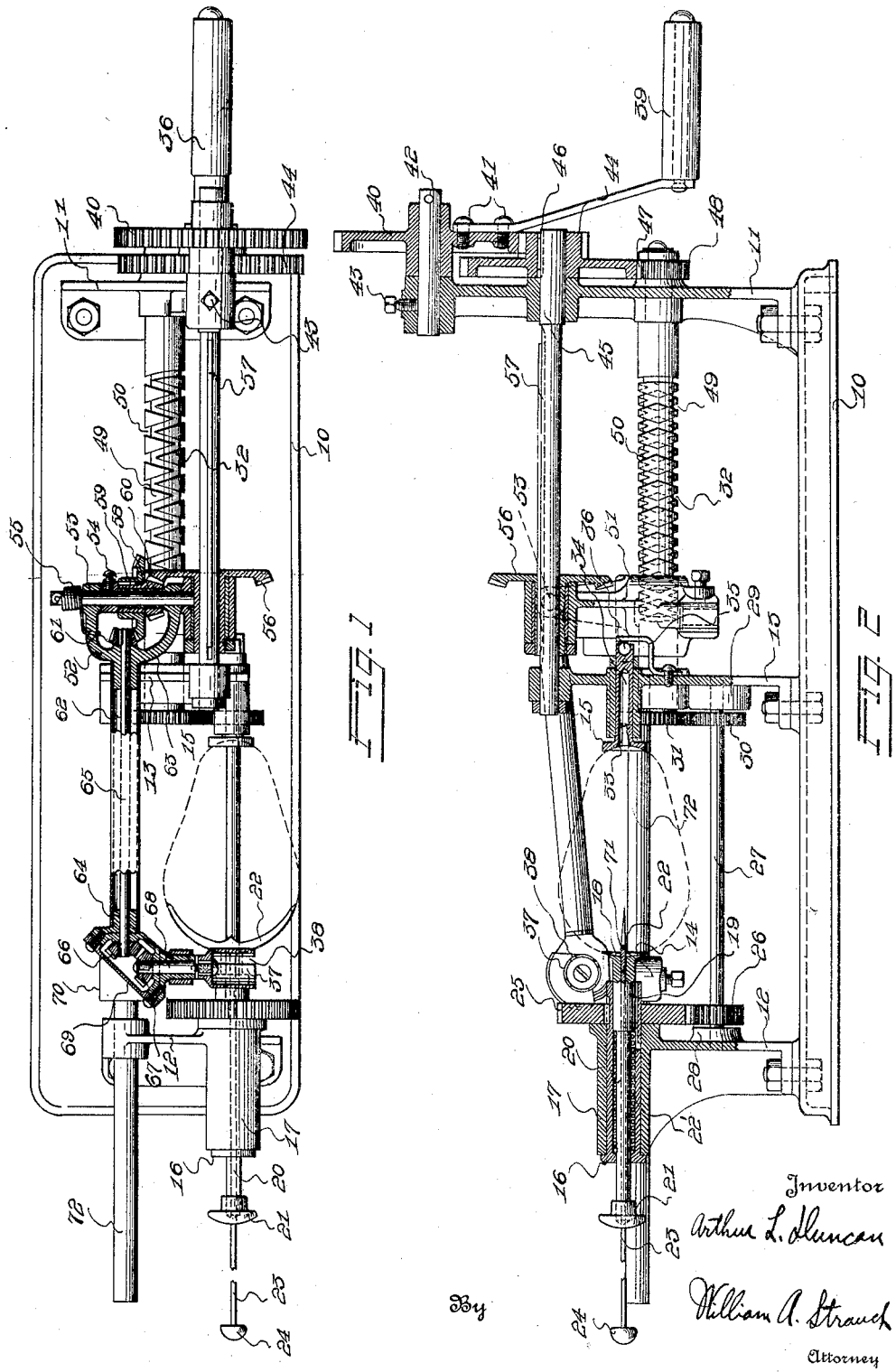

Patented Nov. 10, 1931

1,831,786

UNITED STATES PATENT OFFICE

ARTHUR L. DUNCAN, OF PIEDMONT, CALIFORNIA, ASSIGNOR, BY MESNE ASSIGNMENTS, TO CALIFORNIA PACKING CORPORATION, OF SAN FRANCISCO, CALIFORNIA, A CORPORATION OF NEW YORK

FRUIT PEELING APPARATUS

Application filed April 20, 1926. Serial No. 103,291.

The present invention relates to paring and peeling methods and apparatus and more particularly to improved methods and apparatus for paring fruit, such as pears, apples, and the like, and also for peeling vegetables. This case is a continuation in part of applicant's copending application Series No. 100,954, filed April 9, 1926.

It has been proposed to peel pears by using machines in which the pear is rotated on its longitudinal axis against a knife constructed to remove the outer surface or skin of the fruit. As the pear is revolved in such devices, the knife removes the skin in circumferential cuts leaving a series of circumferential ridges around the fruit, and giving the fruit an undesirable appearance. This type of machine for peeling pears has been discarded in the higher grade canneries, and the higher grade pears are now peeled with the skin removed by cutting thin longitudinal slices from the pear. The operation of hand peeling pears as now practiced is slow, and wasteful. Pears are received in the canneries in between the times when different crops of peaches ripen. With improved peach pitting methods and devices that have been recently developed, the amount of labor necessary to pit peaches is reduced considerably below that necessary to hand peel pears. In order to have enough labor to hand peel the pear crop, an over supply of labor for the pitting of peaches must be at present kept if the most improved and efficient methods of pitting the peaches are utilized.

Accordingly a primary object of the present invention is to provide methods and apparatus for the peeling of pears in rapid and efficient manner, leaving fruit of high grade appearance, although it should be understood that the methods and apparatus are adapted to the peeling of other fruits and vegetables as well as pears.

It is a further object of the invention to provide a method and apparatus for removing the peel by a scraping action that extends helically of the article to be pared, rather than circumferentially or substantially so. By this arrangement the objectionable ridges, that appear on pears peeled circumferentially, does not appear and fruit peeled by the machine hereinafter described has the shape and surface appearance essential to the best quality of goods.

A still further object of the invention is to provide a machine embodying a rotary cutter turning about an axis which moves endwise of the fruit, and which includes means to continuously shift the relative position of the frut and cutter so that the skin will be removed rapidly and effectively without close attention by the operator.

Still further objects of the invention will appear as the description thereof proceeds with reference to the accompanying drawings, in which Figure 1 is a horizontal section of the preferred embodiment of my invention.

Figure 2 is a vertical sectional view of the machine shown in Figure 1.

Like reference numerals refer to like parts throughout the several figures.

On a base 10 suitable standards 11, 12 and 13 are secured. The fruit, such as a pear, is supported in aligned holders 14 and 15 carried by standards 12 and 13 respectively. Holder 14 is carried by a sleeve 16 rotatably mounted in a cylindrical extension 17 of the standard 12. Holder 14 comprises a concaved head 18, a body portion 19, which is slidably keyed in sleeve 16, and a stem 20 provided with a handle 21 suitably secured thereto. Holder 14 is urged toward holder 15 by a coil spring 22', but may be drawn rearwardly against the action of spring 22' when it is desired to release the fruit. In order to maintain the fruit from rotating with respect to the holder, a halving blade 22 designed to enter the blossom end of the fruit is provided. Blade 22 is secured to a spindle 23 that extends through a bore through body portion 19 and stem 20 and is provided with a handle 24, as described in the copending application above referred to.

Keyed and rotatable with sleeve 16 is a spur gear 25. Spur gear 25 is driven by a pinion 26 secured to a shaft 27 journaled in bearings 28 and 29, secured to standards 12 and 13. Shaft 27 is driven by a gear 30 meshing with a pinion 31 secured to feed screw shaft 32 presently to be described.

Holder 15 is provided with a concave head 33 and is bored longitudinally as shown at 34 to receive the stem of the fruit. This holder is freely rotatable in standard 13, and is held from endwise movement by a bracket 35 between which and the end of the holder a ball 36 is mounted to reduce the friction between these parts when the fruit is turned about its longitudinal axis. Obviously, holders of differing sizes and forms may be employed in accordance with the kind of fruit being operated upon.

The fruit held between holders 14 and 15 is pared by a rotating cutter 37 in the form of an open ended cylinder, slotted as at 38 from the open end to provide a plurality of cutting edges. It is obvious that the slots in the cutter may be straight or curved, and that they may be concave, all as described in said copending case. The cutting edges are beveled and the adjacent edge of each slot is likewise beveled to determine the depth of the cut as described in said case.

The cutter rotates about an axis which is substantially at right angles to the vertical plane containing the axes of holders 14 and 15, and is moved bodily to and fro from one holder toward the other, while the fruit is being slowly rotated by the mechanism above described.

The machine is operated by a handle 39 fixedly secured to a gear 40 by screws 41. Gear 40 turns freely on a shaft 42 held in standard 11 by a set screw 43. Gear 40 meshes with and drives a double gear 44 which in turn is secured to shaft 45, journaled in standards 11 and 13 by means of key 46. Gear 44 is provided with spur teeth 47 meshing with a pinion 48 which is secured to and drives shaft 32 before referred to. Shaft 32 has secured thereto or formed integrally therewith, a feed screw 49 with a continuous spiral groove 50 having oppositely inclined sections cut therein.

Mounted for reciprocation on shaft 32 and feed screw 49 is a carriage 51. Means are provided in said carriage 51 engaging the grooves 50 in feed screw 49 to cause said carriage to reciprocate and automatically reverse its direction of movement as described in detail in said copending application.

Cutter 37 and the means for rotating it are carried on an arm 52 which swings on a spindle 53 fixed in carriage 51 by a set screw 54. A portion of the weight of arm 52 and the parts carried thereby is supported by a spring 55 coiled around and secured to spindle 53 so that the cutter rests with the proper degree of pressure on the fruit and may readily follow the contour of the fruit as it moves back and forth.

Journalled in carriage 51 and slidably mounted on shaft 45 is a bevel gear 56 which is slidably keyed to shaft 45 by a long feather 57. Gear 56 meshes with and drives bevel pinion 58 rotatably mounted on spindle 53. Pinion 58 is provided with a cylindrical extension 59 upon which is keyed a bevel gear 60 meshing with bevel pinion 61 secured to a shaft 62. Shaft 62 is journalled in a yoke 63 of arm 52 and in a casting 64 secured to yoke 63 by a tubular member 65 through which shaft 62 passes. Keyed to the end of shaft 62 is a bevel gear 66 meshing with and driving a bevel gear 67 keyed to the spindle 68 of the cylindrical cutter 37. A plate 69 is secured to casting 64 and serves to house the gears 66 and 67.

In order to prevent engagement of the rotating cutter with the holders 14 or 15 at the completion of a stroke, a rest 70 is provided to receive casting 64. Rest 70 is part of a bracket 71 (see Figure 2), secured to a rod 72 which is slidable through standards 12 and 13 and is secured to carriage 51 so that the rest follows the movement of the cutter and is always in position to receive it whenever it moves out of engagement with the fruit.

In operation a fruit, such as a pear, is placed between holders 14 and 15, the former of which is retracted by handle 21 to permit ready insertion of the fruit. When handle 21 is released the blade 22 is caused by spring 22' to be imbeded in the fruit thereby holding it unmovable with relation to the holders. The operator then rotates handle 39 causing the cutter 37 to rotate and at the same time causing the carriage 51 to move forwardly. The cutter yieldingly engages the fruit removing the skin thereof as it follows the contour of the fruit cleaning out the depressions thoroughly. As the cutter reciprocates holder 14 is being slowly rotated by gear 31, secured to the feed screw shaft 32, gear 30 secured to shaft 27, and gears 26 and 25 secured to shaft 27 and the holder 14 respectively. It will be apparent that in this way the skin of the fruit is removed in helical lines, but as the cutter rotates rapidly the skin is removed by a scraping action. This operation is repeated until the entire skin is removed. The operator then halves the fruit by operation of halving knife 22 by handle 24 and withdraws the fruit by retracting handle 21 to separate the holders.

It will be understood by those skilled in the art that the invention is not limited to the particular details hereinbefore set forth, but the scope thereof is to be limited only by the terms of the appended claims. Accordingly, having described a preferred embodiment of my invention, what is desired to be secured by Letters Patent and claimed as new is:

1. A fruit peeling machine comprising a support having a plurality of spaced uprights, fruit holders slidably mounted in said uprights for movement toward and from each other and for rotation therein, means to yieldingly press said holders toward each other, a gear secured to one of said holders, a drive pinion meshing with said gear, a cylindrical cutter, a rotating shaft to bodily reciprocate said cutter between said holders, a second shaft to rotate it on an axis transverse to its line of reciprocatory movement, gearing operatively connecting said shafts together and to connect said first named shaft to said drive pinion.

2. A fruit peeling machine comprising a base, spaced standards, fruit holders slidably mounted in said standards, a spring to press said holders toward each other, means to continuously rotate one of said holders, a cutter rotatably mounted adjacent the end of an arm to rotate on an axis extending at right angles thereto, a bracket upon which said arm is pivoted, mechanism to reciprocate said bracket, means to control the swinging movement of said arm and to act as a counterbalance for said arm, and gearing to rotate said cutter as said bracket is caused to reciprocate.

3. A fruit peeling machine comprising means to support a fruit and slowly rotate it, an arm pivotally mounted to swing about an axis transverse to the axis of rotation of said fruit, a cutter journalled adjacent the end of said arm for rotation on an axis parallel to the axis about which said arm swings, a bracket for said arm, means to reciprocate said bracket, a shaft on which said bracket slides and gearing between said shaft and said cutter to rotate said cutter as said arm is reciprocated.

4. A fruit peeling machine comprising a base, a pair of shafts extending lengthwise thereof, a bracket arranged on said shafts, means between one of said shafts and said bracket to reciprocate the latter, a gear carried by said bracket and slidably mounted on the other shaft, an arm pivoted on said bracket on a shaft transverse to said first named shafts, a rotatable cutter arranged adjacent the end of said arm, gearing between said gear and said cutter to rotate the latter, and means to support and continuously rotate a fruit on an axis substantially parallel to said first named shafts in position to be operated upon by said cutter.

5. A fruit peeling machine comprising a base, a plurality of standards arranged in spaced relation on said base, fruit holders supported by said standards; means to continuously rotate said holders, a pair of parallel shafts extending between said standards, a bracket slidably mounted on said shafts, means between one of said shafts and said bracket to reciprocate it, an arm pivoted on said bracket and extending parallel to said shafts, a rotatable cutter mounted on a shaft extending transverse to said arm adjacent the end thereof, and gearing driven by the other of said first named shafts for rotating said cutter.

6. A fruit peeling machine comprising a pair of fruit holders designed to engage the stem and blossom ends of the fruit, means to continuously rotate said holders, means to yieldingly press one holder toward the other, a cutter support mounted to swing about an axis transverse to the axis of rotation of said holders, said support comprising an arm extending substantially parallel to the axis of the holders, and a rotatable cutter mounted adjacent the end thereof on a shaft extending at right angles to said arm, mechanism to rotate said cutter, and mechanism to bodily move said arm to and fro between said holders.

7. A pear peeling machine comprising means to yieldingly hold the pear, a rotatable cylindrical cutter provided with a multiplicity of cutting edges each of which is separately guarded by a guard disposed relatively closely to the cutting edge, a carriage mounted for reciprocation in a direction parallel to the longitudinal axis of said pear, a yielding arm carried by said carriage, a rotatable shaft journalled in said arm for rotation about an axis disposed at right angles to the direction of movement of said carriage, said cylindrical cutter being secured to said last named shaft, and means to continuously rotate said holding means and to simultaneously reciprocate said carriage and rotate said cylindrical cutter whereby the peel is removed from said pear in comminuted form in cuts formed along helical paths.

In testimony whereof I affix my signature.

ARTHUR L. DUNCAN.